United States Patent [19]  [11]  4,265,925
Campbell et al.  [45]  May 5, 1981

[54] BLAND VEGETABLE PROTEIN PRODUCT AND METHOD OF MANUFACTURE

[75] Inventors: Michael F. Campbell; Richard J. Fiala; James D. Wideman; John F. Rasche, all of Decatur, Ill.

[73] Assignee: A. E. Staley Manufacturing Company, Decatur, Ill.

[21] Appl. No.: 973,194

[22] Filed: Dec. 26, 1978

Related U.S. Application Data

[63] Continuation-in-part of Ser. No. 812,551, Jul. 5, 1977, abandoned.

[51] Int. Cl.³ .............................................. A23J 3/00
[52] U.S. Cl. ................................... 426/641; 426/656; 426/430; 426/465
[58] Field of Search ............... 426/590, 598, 618, 641, 426/646, 656, 430, 465; 260/123.5, 412.5; 34/10

[56] References Cited

U.S. PATENT DOCUMENTS

| | | | |
|---|---|---|---|
| 2,618,560 | 11/1952 | Leslie | 426/430 X |
| 2,881,159 | 4/1959 | Circle et al. | 426/431 X |
| 3,023,107 | 2/1962 | Mustakas et al. | 426/430 |
| 3,043,826 | 7/1962 | Beaber et al. | 426/430 X |
| 3,689,279 | 9/1972 | Bedenk | 426/656 X |
| 3,809,767 | 5/1974 | Sair et al. | 426/656 X |
| 3,895,003 | 7/1975 | Swain et al. | 426/656 X |
| 3,943,263 | 3/1976 | Sato et al. | 426/656 X |
| 3,970,764 | 7/1976 | Karnofsky | 426/430 |
| 3,982,004 | 9/1976 | Obata et al. | 426/656 X |

Primary Examiner—Robert A. Yoncoskie
Attorney, Agent, or Firm—M. Paul Hendrickson; Charles J. Meyerson

[57]   ABSTRACT

A solvent extraction and desolventizing process is disclosed which removes substantially all flavor-bearing substances from a moist vegetable protein concentrate, provides a nitrogen solubility index (NSI) of about 6–15, a Bostwick flow value of less than 10, a water absorbency of the concentrate in the range of 270–350, and a penetrometer reading in the range of 7–30 mm so that said vegetable protein concentrate may be used as a protein-containing ingredient in prepared meats.

The process includes extracting defatted vegetable protein flakes with an aqueous alcohol solution to remove soluble carbohydrates and flavors, leaving an extracted product having a moisture and volatiles content of about 50–70% by weight. The alcohol-extracted product which contains about 20–40% by weight water, is thereafter desolventized in a humid gas atmosphere with a relatively low gas temperature of less than about 260° F. (127° C.) for about 1–6 hours. The resulting, desolventized vegetable protein concentrate is very bland and light colored, and is an economical protein ingredient for foods. The desolventizing removes substantially all remaining solvent from the bland product so that the resulting product contains less than about 0.1% (1000 ppm) residual alcohol, and preferably less than 0.01% (100 ppm) alcohol.

The process has primary application to vegetable protein concentrates derived from soybeans. Other potential vegetable protein raw materials include repeseed, sesame seed, safflower seed, cottonseed, sunflower seed, peanut, maize, yellow field pea and horse bean.

18 Claims, No Drawings

BLAND VEGETABLE PROTEIN PRODUCT AND METHOD OF MANUFACTURE

This is a continuation-in-part application of Ser. No. 812,551, filed July 5, 1977, now abandoned.

BACKGROUND OF THE INVENTION

As the world population increases and the consumption of animal protein increases, the need for supplementary vegetable sources of protein increases in direct proportion. The demand for less expensive protein has expanded greatly because the overall protein demand and ever-increasing production costs have driven the cost of animal protein to new record levels.

Traditional meat products have characteristic flavors, textures and overall appearances which are still in demand. The most effective and acceptable way to reach the increasing protein market with a vegetable protein product is by combining the vegetable protein product with conventional animal protein products such as frankfurter sausages, braunschweiger, and other prepared meats, or by creating a meat analog which has all the desired organoleptic appeal.

Such meat analogs simulate meat products with a total vegetable product having the texture, flavor and appearance of the meat product, such as hamburger, chicken, turkey, beef and the like. The flavors must be added to the basic vegetable protein product, and product texture is obtained by extrusion, spinning, precipitation or other means. Quality control to ensure continued excellent flavor, texture and appearance is essential, because one off-quality release can damage the product's reputation in a lasting way.

The combination of vegetable protein with meat products utilizes the natural flavor of the meat product. The vegetable protein is added to increase the total useful protein of a given amount of meat product at a reduced cost to the ultimate consumer who wants to pay less, but without sacrificing natural meat flavor, texture and appearance.

The vegetable products which are combined with such meat products should therefore be as bland in flavor as possible, and should not counteract the normal texture, moisture level and appearance of the meat products with which they are combined. Many vegetable protein materials presently available have been combined with meat products, with varying levels of success. In some cases, the meat-vegetable protein product absorbs moisture at a nonuniform rate, resulting in a mushy, uneven and unsightly texture. Some vegetable protein products have been processed at high temperatures, and have a characteristic "toasted" taste which adversely affects the meat flavor. Other vegetable protein products have a too high, or too low, protein solubility index compared to the meat product, and the combination product has an undesirable texture.

The object of such meat-vegetable protein combinations should be to obtain a protein product as good, or better than, the meat product in nutritional level, in general appearance, texture and flavor. Soy protein concentrates, in particular, tend to have a somewhat "beany" flavor, although they have excellent protein content. A bland soy protein concentrate which does not interfere with the meat product texture and flavor is, therefore, a most desirable product which will enjoy a rapidly expanding market if present demands continue. An economical and reliable method for making such a bland protein concentrate having a consistent nitrogen solubility index and water absorption properties within a desired range has been the goal of applicants' development efforts. Bland soy protein concentrate is also desirable for making meat analogs, snack foods, cereals, baked products and liquid protein foods, such as calf milk replacer and liquid protein supplements for infants.

DESCRIPTION OF THE PRIOR ART

There have been a number of processes proposed for making vegetable protein concentrates in which the object is to obtain a vegetable protein product for combination with meat. U.S. Pat. No. 3,897,574 appears to be using a 60–80% aqueous ethanol for solvent extraction of soybean material to produce a soy protein concentrate. The patent recognizes the need to remove soluble nonproteinaceous matter, including objectionable flavor from the defatted soybean material, but contrary to the prior art described by the patentee, the patent teaches a method of carefully washing the ethanol solvent used for the sugar extraction step of the process because, it is stated, there is a correlation between the flavor problem and the operation of the ethanol rectifying column. The flavor and odor contaminants are said to be effectively removed from the rectified ethanol by withdrawing the ethanol from a point in a zone in the column having a temperature in the range of about 180° F. to 200° F. However, even the patentee concedes that his product was "relatively bland with slight cooked cereal flavor notes" (U.S. Pat. No. 3,897,574, column 6, lines 41–42). The temperature range (180°–205° F.) during the ethanol treatment may well have been the cause of the "slight cooked cereal flavor notes" reported. Such detectable flavors are undesirable in a truly bland soy protein concentrate to be used in combination with any meat products because the flavor affects the meat product flavor.

The following U.S. Pat. Nos. 2,881,076; 3,635,726 and 3,809,767 are directed to an isoelectric water-wash process for making soy protein concentrate with various improvements. The earliest of this series of patents points out that shorter-chain, less desirable glycinins are insoluble in water at a pH in the range of the isoelectric point, and soluble in a more alkaline pH range. To separate out the "beany flavor" components, the patentee describes and claims dissolving the natural water-soluble ingredients in water at a pH in the vicinity of the isoelectric point of the glycinin content of the soybean material, separating the solids from the solution, and then washing the solids with water to remove the beany taste from the solids. The "beany taste" components are said to go off in the aqueous effluent.

U.S. Pat. No. 3,635,726 describes and claims a method based on U.S. Pat. No. 2,881,076 in which both the fibrous portion and a precipitated protein isolate are washed to remove the "beany taste," and these washed components are recombined to produce a soy protein concentrate. Finally, U.S. Pat. No. 3,809,767, issued to the same inventor and another, describes and claims the method of making vegetable protein concentrate having a nitrogen solubility index above 15% by weight by washing the defatted vegetable protein flakes with water in the vicinity of the isoelectric pH of the protein to remove the soluble, undesired taste-conferring material. The insoluble, wet protein material is then dried to 20–45% moisture without lowering its nitrogen solubility index to below 15%. The pH is then raised, and the controlled drying continued.

The patented process is said to result in less flavor, good protein solubility, minimized denaturation, good water-absorption and water-retention, good water-binding properties, and at least 60% by weight protein (dry basis). The above properties are desirable, but opinions differ as to what levels of water absorption, for example, are desirable, and the close control required for the successful practice of the isoelectric water-wash makes the commercial scale duplication of laboratory results a difficult and costly goal. The patent reports only a pilot plant operation. It must be seriously doubted that it is possible to eliminate all characteristic flavors consistently in commercial production using the above method.

Color is also an uncertain factor, and must be light so that the meat product appearance is not modified in any questionable way. Acceptance by consumers often depends on the meat product appearance, all other things being equal. Most consumers will not try something new if it does not "look right."

The cost of the above method can be expected to be higher on a commercial scale because of the closer surveillance required, pH adjustments and washing procedures. In addition, there is a much greater opportunity for the strong flavor components to stay with the products in a single-solvent (water) system in which the product is precipitated, especially in commercial scale production. Commercially obtained samples of soy protein concentrate identified as Gl-301, and which the above patent reports is made by the method of U.S. Pat. No. 3,881,076, cost more than applicants's product, and independent tests comparing the products found that applicants' product has less flavor and color than Gl-301. Less flavor and color are more desirable properties for products which are used in combination with meat.

A recent U.S. Pat. No. 3,971,856 issued July 27, 1976, is not believed to be "prior art" to the subject invention, but it is of interest because it describes a somewhat different approach to efforts to make a bland soy protein concentrate. This patent describes preparation of a full-fat soy protein concentrate, said to be bland in taste and light in color. Dehulled, cracked soybeans are subjected to water at 180° F. to 212° F., taken from the water, washed with fresh water and dried. The product may then be treated with hexane to remove oil and to produce a defatted soy protein concentrate. The patent specification concedes that the process causes a loss in water solubility of the protein (See U.S. Pat. No. 3,971,856, column 1, lines 51–60). Considerable space is devoted to a description of the undesirable taste of soybean materials and efforts to remove it (Ibid, column 3, lines 8–37).

An earlier patent issued to the same assignee (U.S. Pat. No. 3,925,569) describes a method of processing soybeans employing an alcohol-water soak (24–72 hours). Example 10 of this patent reports that even better results were obtained when a three-cycle water-soaking procedure was added at the end of the process. The Example 10 products were judged to be more bland, more porous, softer in texture and lighter in color than the products made by the same process, but without the three-cycle water soak. The implication is that the basic process only produces a lesser level of flavor, color, etc. and that even the Example 10 product is merely a lesser level than the basic product, but still has some flavor, color and other unwanted properties.

The process of U.S. Pat. No. 3,925,569 is in reverse order compared to applicants' process. Patent 3,925,569 describes an alcohol/water soak which precedes the defatting step. In contrast, our process first accomplishes defatting with some flavor removal by extraction employing a hexane/aqueous alcohol solvent mixture. Thereafter, the remaining flavor-causing materials are washed from the defatted, already bland vegetable flakes. Following this, the very bland soy protein concentrate material is very carefully desolventized at low temperatures in a continuous, fluidized bed desolventizer using a humid, inert gas atmosphere, which is continuously recirculated. The total desolventizing time is in the order of one or more hours.

U.S. Pat. Nos. 3,023,107 and 3,268,503 describe a process developed at the U.S.D.A. Regional Laboratory, Peoria, Ill. U.S. Pat. No. 3,023,107 discloses desolventizing a soybean meal in a super-heated (149°–158° C.) closed system vapor stream, and the residence time of the material in the desolventizer is not more than five seconds. The NSI of the product was 69.71, and it contained 1.8% residual ethanol. In contrast, the subject method uses a much lower gas temperature (less than 99° C.), and residence time in the desolventizer is in the order of hours, not seconds. The amount of residual ethanol reported was 1.8%, which would be too high under the subject process, which typically has a residual alcohol content of less than 0.2%. The NSI of the USDA product is considerably higher than that of the subject invention. The countercurrent alcohol extraction step described in the above patent has a duration of about 18–36 minutes.

U.S. Pat. No. 3,268,503 describes a process similar to 3,023,107, but uses more dilute alcohols (50–70%), higher temperatures (370°–375° F.), and slightly longer fluidization times (7–9 seconds). The patentees claim better absorption properties (3.5–4 times its weight in water) for this product, compared to their earlier product. The NSI reported here was 4.1% (Example 1) up to 5.07% (Example 3), which is below the NSI range of 6–15 found functionally desirable in the product of the subject invention.

A number of articles have been published by G. C. Mustakas et al. describing the USDA flash desolventizing system. See: *The Journal of The American Oil Chemists Society*, 36: 256–260 (1949); 38: 473–478 (1961); and 39: 222–226 (1962). The same general comments apply to these publications as were made above regarding the USDA patents. The "flash desolventizing" system generally employs a much higher desolventizing temperature, and a much shorter residence time in the flash desolventizer than does the subject process. Apparently, flash desolventizing does not remove the process's residual alcohol sufficiently, because the USDA experimenters reported an alcohol odor in their product.

The most recent publication (April, 1962) in the above series of publications and patents by G. C. Mustakas et al. describes the characteristics of the product resulting from flash desolventizing. The residual alcohol in the flakes was 0.25–1.0%, and the washed flakes had an NSI value of 13–24 before desolventizing, which was further reduced to an NSI range of 7–16 during desolventizing. The publication states that the residual alcohol was detected by organoleptic evaluation (See JAOCS. 39:225, 226 (April 1962)). The subject low temperature desolventizing process is capable of reducing the residual alcohol level substantially below this level, to less than 0.1% (1000 ppm) which was not detectable in organoleptic tests. The actual alcohol residue remaining in the USDA product would be considerably higher using other test methods such as gas liquid chromatography.

Nielsen has described the combination of hexane extraction and hexane/alcohol extraction. See *J. of American Oil Chemists' Society*, Vol. 37, May, 1960, pp 217-219, and similar processes are described in U.S. Pat. Nos. 3,734,901 and 3,878,232. None of these describe a final step of desolventizing at a low temperature over a relatively long period of time in the order of one to six hours. In addition, these references describe an initial hexane extraction, followed by a hexane/alcohol treatment. The subject invention can eliminate the initial hexane extraction step described above, and follows the hexane/aqueous alcohol treatment with an aqeuous alcohol extraction and thereafter, a low temperature, fluidized bed desolventizing with a long residence time. The resulting bland vegetable protein concentrate has a lower level of residual solvent than has been heretofore considered possible. The resulting product has been found to be uniquely suitable as a bland protein extender for frankfurters, braunschweiger and similarly by prepared meats.

The desolventizing process described in U.S. Pat. No. 3,578,498 is directed to the removal of solvent from starch employing a hot humid gas or steam in a fluid bed. Temperature of the starch is maintained in the range of 160° F. to about 320° F. The minimum relative humidity of the hot humid gas is 40%. The fluid bed equipment described in the patent was a jacketed upright tube, and appears to have been a batch process. In comparison, the subject process is continuous, and the vegetable protein concentrate is kept below a temperature of 160° F. to obtain the best results and preserve a desirable NSI index of about 6-15. The subject product primarily comprises protein, instead of starch, and the temperature of the hot humid gas used for desolventizing is maintained below 220° F., preferably 180° F. In contrast, the reference patent only discloses gas temperatures above 180° F., and typically above about 217° F., because the starch bed temperature is maintained at this level, or higher.

A series of patents have issued to Truman B. Wayne, which describe the processing of rice employing solvents such as n-hexane, n-heptane, ethanol, acetone, ethyl ether and isopropyl ether. Such patents include U.S. Pat. Nos. 3,165,134; 3,217,769; 3,261,690; 3,519,431 and 3,630,754. Desolventizing of the head rice product is accomplished by hearth type and rotary desolventizers, but the patentee also considers such desolventizers may be replaced by a stationary column, moving bed fluidized, countercurrent tower or vacuum desolventizers, with saturated steam or inert gases being employed as the desolventizing medium (U.S. Pat. No. 3,261,690, column 13, lines 71-75, column 14, lines 1-4).

U.S. Pat. No. 3,519,431, at columns 13-16, describes the processing of fibrous, proteinaceous and starchy fractions of grain. The principal "grain" subjected to the method is rice, although the patent does mention that the process is applicable to cereal grains comprising wheat, maize or corn, rye and the sorghum grains. Considerable emphasis is placed on the recovery of the starchy endosperm (see column 14, lines 37-42, column 15, lines 64-75, column 16, lines 1-32). The protein and fiber constituents are apparently desolventized employing the recycled superheated vapor stream (240° F.-340° F.), far above the temperature of the desolventizing gases used under the method of the subject invention. The proteinaceous materials are sold as feed stock see U.S. Pat. No. 3,519,431, column 15, lines 35-63).

Other patents of general interest include U.S. Pat. Nos. 2,618,560; 2,881,159; 3,043,826; 3,689,279; 3,895,003; 3,943,263; 3,982,004 and 3,970,764. U.S. Pat. No. 2,618,560 is directed to an early desolventizing apparatus which includes a mechanical rotor means which moves the materials to be desolventized through a heating zone. Methods for isolating soy protein products are described in U.S. Pat. Nos. 2,881,159; 3,043,826 and 3,689,279. In general, it may be stated that each of these methods requires additional steps with consequent added cost to obtain a soy protein isolate product.

U.S. Pat. No. 3,895,003 is directed to a process using air classification to produce a coarse fraction from which a protein concentrate is obtained by a water or alcohol wash. The patent provides no description of desolventizing, however, and there is no mention of what levels of residual solvent may be found in the soy protein concentrate resulting from the method described. U.S. Pat. No. 3,970,764 describes a desolventizing method in which a vapor having an alcohol content higher than that of the solvent retained by the flakes is recycled to the desolventizer to thereby preserve protein dispersibility of the extracted flakes. There is no disclosure of the levels of solvent residue remaining in the flakes after the process.

U.S. Pat. Nos. 3,943,263 and 3,982,004 describe soy protein-meat combinations and simulated meat products, respectively. The former patent states that soy protein isolates are preferred, although textured vegetable protein and soy protein concentrate can be used. The soy protein concentrate is not further described. The latter patent (3,982,004) describes only the combination of a fibrous vegetable protein with a non-textured proteinaceous paste which may include fish meat paste, pastes of minced or scrap mutton or chicken meat and "separated" soy protein pastes, which are further described as "isolated soy proteinaceous material."

SUMMARY OF THE INVENTION

The subject process combines hexane/aqueous alcohol extraction of the soy flakes starting material to obtain a defatted, bland soy flake product followed by an aqueous alcohol extraction to remove substantially all remaining flavor substances. The alcohol is removed and recovered from the bland, light-colored soy protein by means of gentle desolventizing is a continuous fluidized bed desolventizer employing a humid, inert gas atmosphere at a gas temperature of less than 260° F. (127° C.) and preferably in the range of about 190°-200° F. (87.8°-93.3° C.). Desolventizing and then drying to obtain a completely dry, bland soy protein concentrate requires a residence time in the fluidized beds of about one to six hours, and the resulting product has a nitrogen solubility index of about 6-15%, a Bostwick flow value less than 10, and a water absorption value of 270-350. More important, the bland soy protein concentrate made by this process has substantially no detectable flavor, and is very light in color. The inert gas may be nitrogen, or carbon dioxide, or mixtures thereof. Argon or helium also could be used. Air is considered hazardous due to the development of explosive vapor concentrations in the desolventizing operation. At present, nitrogen gas is preferred.

Independent blind test comparisons of the functionality of the subject product used in combination with frankfurter sausages, braunschweiger and other prepared meats demonstrated that the very bland soy protein concentrate product made by the process of the subject invention is superior to other available soy protein concentrates, both in its undetectable effect on the meat products' flavor, and in the desirable texture and mouthfeel of such products. It is presently believed that the very bland taste, the middle range NSI (6–15%) value, the Bostwick flow value (less than 10), and the water-absorption value (270–350) of the subject bland soy protein concentrate are important properties which make the subject product ideal for use in combination with frankfurters, braunschweiger, and other fabricated, combination soy protein concentrate/meat products.

The method of the subject invention insures that the soy protein concentrate obtained will be flavorless. The key to removing all flavors from the product appears to be the steps of: extracting the soy flakes, first with a mixture of hexane, alcohol and water; subsequent washing with alcohol and water; and, finally, careful, low temperature desolventizing, which effectively removes traces of alcohol solvent from the extracted and washed bland product.

DETAILED DESCRIPTION OF THE INVENTION

An outline of the process of the subject invention is set forth immediately below:

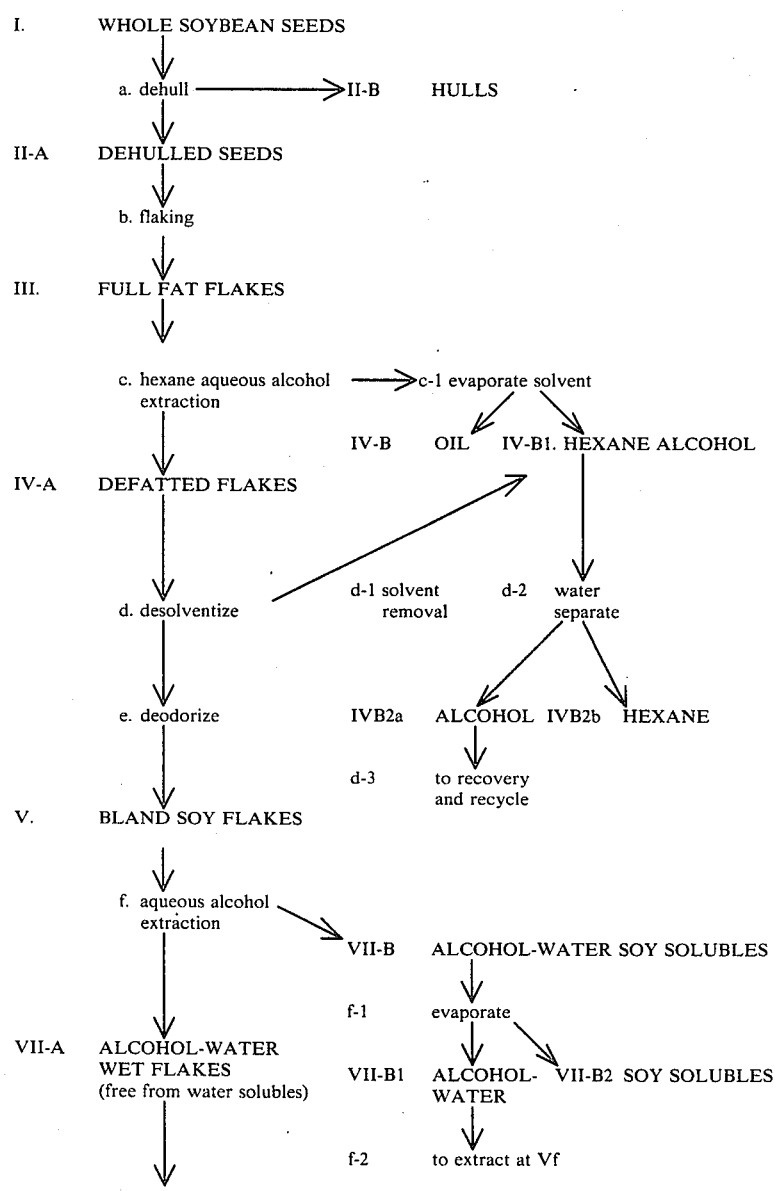

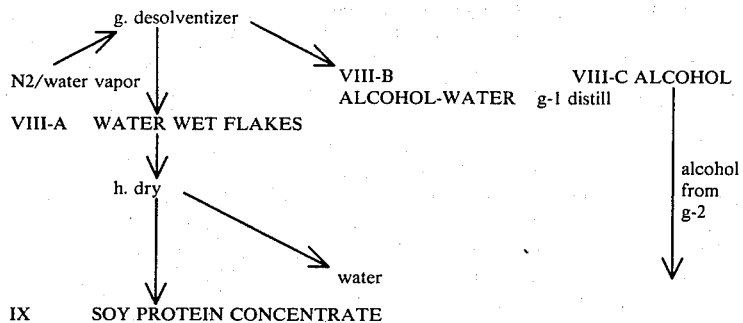

IX SOY PROTEIN CONCENTRATE

EXTRACTION SOLVENTS

The mixtures of hydrocarbon/aqueous lower alcohol may comprise as little as about 10% aqueous ethanol (3A alcohol) and about 90% hexane, up to about 20% aqueous ethanol (3A alcohol), and about 80% hexane. Other useful hydrocarbons include heptanes and substituted hydrocarbons, such as dichlorodifluoromethane ("Freon," sold by E. I. DuPont, Inc., Wilmington Del.). Other aqueous lower alcohols may be used, including methanol, isopropanol, n-propanol and possibly isobutanol, in both extraction steps. Special care must be taken in the desolventizing step to remove substantially all remaining methanol, if it is used, since it is toxic. The desolventizing process described is believed to be quite effective for this purpose.

The 20% aqueous alcohol (3A alcohol) 80% hexane solvent mixture has the general properties of an azeotropic mixture. It does not separate when vaporized, but has a definite boiling temperature and condensing temperature to facilitate recycling and other steps of the extraction process.

The aqueous lower alcohol extraction of the bland, defatted soy flakes assures removal of carbohydrates including stachyose and raffinose, and other alcohol and water soluble contaminants still remaining after the first extraction. Concentration of the aqueous lower alcohol solvent ranges from 60-75% (40-25% water). About 60% alcohol is preferred (40% water), because soy protein appears to be least soluble in about a 50/50 alcohol/water mixture with increasing protein solubility towards either end of the range. Excess water in the extraction solvent is to be avoided because of added energy costs for removal, and because an extremely wet soy protein cake tends to agglomerate, clogging the process equipment. The solvent recovery systems shown in the above outline can be modified to obtain the most efficient solvent use and recovery.

A detailed description of the general procedure for preparing defatted flakes (Steps I-IV) for the further refining steps (V-IX) outlined above is found in U.S. Pat. No. 3,734,901 (FIG. 1 of the drawings). In the process of the subject invention, the initial hexane extraction of the full fat flakes can be omitted (Step a in FIG. 1 of U.S. Pat. No. 3,734,901). It has been found that an initial extraction of full fat flakes with a solution of hexane and aqueous alcohol is sufficient to produce a defatted flake which is relatively bland and suitable for many uses, but which is also further treated with an aqueous alcohol solution to completely remove water-soluble carbohydrates, such as raffinose and stachyose, and off-flavor materials. The resulting product is completely bland, but contains alcohol which must be removed.

As shown in the above outline, the alcohol/water wet flakes are desolventized in a humid, inert gas atmosphere which comprises nitrogen gas and moisture. Carbon dioxide gas can also be used instead of nitrogen. Care is taken to keep the temperature of the aqueous alcohol wet flakes below 175° F. (79.4° C.) during desolventizing, and preferably, at a temperature in the range of about 120°-155° F. (48.9-68.3° C.). The aqueous alcohol wet flakes gradually give up the residual alcohol, and then contain only moisture at about 20-40% by weight. The desolventizing takes approximately 1-6 hours. The water wet flakes are then dried to obtain a completely bland soy protein concentrate (SPC) from which substantially all of the flavor bearing materials have been removed. The resulting SPC flake product has a nitrogen solubility index (NSI) of about 6-15, and it is light in color. The Bostwick flow value is less than about 10, and the water absorption value of the product is in the range of 270-350, using the test procedures described in detail below.

The bland soy protein concentrate product of the subject invention has proven to be very useful in combination with frankfurters, braunschweiger, olive loaf, and other prepared meats as a "no-fat" high quality vegetable protein extender for animal protein prepared meats. The subject product can also be used as the basic ingredient in simulated meat products, protein-containing cereals and snacks and other protein food products in which flavor is added during processing.

The above outline also shows a series of steps VII-B through VII-B2 and VIII-B through VIII-C which recover the alcohol solvent and produce a useful by-product, soy solubles, presently used in animal feeds such as molasses salt blocks and protein blocks, in which the soy solubles can be used to replace a portion of the molasses and thereby perform the function of a binder in the animal feed block. The use of soy solubles as a binder in animal feed blocks to replace a portion of the molasses is the invention of others, and is not part of the invention claimed herein. The soy solubles can also be used as a fermentation medium.

During the aqueous alcohol extraction, alcohol/water soy solubles are separated and then evaporated, giving alcohol/water (VII-B) and soy solubles (VII-B2). The aqueous alcohol is recycled to step Vf. at the start of the aqueous alcohol extraction.

The desolventizer step causes the removal of an alcohol/ water mixture from the desolventizer, and additional alcohol from the bland soy flakes. This alcohol/water mixture can be distilled to separate out pure alcohol, which may then be recycled through the system as needed.

The desolventizer system employed is preferably continuous, and should be capable of exposing all particles of the alcohol/water wet flakes to the desolventizing action of slightly heated inert gas saturated with water. A fluidized bed desolventizer has been presently found satisfactory for this purpose. Examples of such process equipment include fluidized bed apparatus available from Strong-Scott, Inc., sold under the tradename "Solidaire." Procedyne, Inc. manufactures a fluidized bed system capable of continuously handling large volumes of alcohol/water wet flakes. The flow through the Procedyne enclosed fluidized bed is along a tortuous path, in which the flakes are subjected to the steady, fluidizing action of a hot humid, inert gas. Heated $N_2$ or $CO_2$ gas saturated with water is supplied to the desolventizer to give a dewpoint of about 130°–156° F. on the outlet side of the desolventizer. The dewpoint on the inlet side is maintained in the range of about 100°–140° F., but an inlet dewpoint below about 120° F. is preferred.

The flakes remain in the fluidized bed for at least 1–6 hours and emerge from the outlet end in a moist condition substantially free of alcohol, and any flavor components. The moist flakes are then dried.

To obtain the desolventizing conditions described immediately above employing the Procedyne horizontal fluidized bed continuous desolventizer apparatus, the incoming nitrogen gas temperature is maintained below 260° F. (127° C.). The conditions are controlled as stated above to give an inlet dewpoint of 120° F., and an outlet dewpoint of 130° F. Circulating hot water, or low pressure steam, at 190° F. (87.8° C.) is provided to the indirect heating system of the fluidized bed to aid in maintaining the bed temperature, and to prevent moisture condensation on the walls of the fluidized bed desolventizer. Air blower discharge pressure is maintained in the range of 1–2.5 psig.

The moist flakes (20–40% moisture) are then dried using air at a temperature below 300° F. (149° C.), preferably about 200°–210° F. (93.3°–98.9° C.). Drying of the flakes is presently accomplished in a second fluidized bed similar in construction, size and capacity to the Procedyne desolventizer. Drying of the flakes could also be accomplished in flash or rotary dryers, or other conventional dryers. A completely bland soy protein concentrate is obtained which has proven to be ideally suited for use in combination with a number of prepared meats.

Total estimated time in the drier to obtain a soy protein concentrate at about 5–8% moisture is approximately 1–6 hours, and usually about 3 hours. The fluidized bed dryer employs air at an inlet temperature up to about 300° F. (149° C.) and an outlet temperature of 180° F. (82.2° C.) as the fluidizing medium, the fluidized bed thereby being at a temperature of less than 180° F. (82.2° C.), more specifically, about 175° F. (79.4° C.). The construction of the fluidized bed dryer is similar to the construction of the fluidized bed desolventizer described above. After drying the product is collected, ground, screened, and packed for shipment.

The product typically contains 66–73% by weight (dry solids basis protein, no more than 1000 ppm residual ethanol, and has a moisture content of 5–8%. The nitrogen solubility index (NSI) of the product is typically about 6–15%, urease activity is 8–13 ml. and azeotrope extract residue (Test No. 3) is about 1%. The pH is about 6.5–7.0, the Bostwick flow value is below 10, and the water absorption is in the range of 270–350% using the test procedures described below. Product color is light because of the low temperatures used, and the product has a very bland flavor, and substantially no odor.

The process equipment can be operated on a substantially continuous basis proceeding through the steps outlined above. There are, of course, solvent recovery systems for recovering and recycling solvent. In the present system, hexane and ethanol are recovered and separated after the extraction of full fat flakes. The solvents are evaporated to leave the separated oil which is subject to further refining to remove all traces of solvent therefrom. The hexane and ethanol are then separated and re-used in the process. The defatted flakes are desolventized, and the hexane and ethanol removed are also recirculated as shown in the outline. During aqueous alcohol extraction of the bland soy flakes, the alcohol/water soy solubles are collected and the solvent is evaporated and recycled to the aqueous alcohol step. The alcohol/water wet flakes are then desolventized, and the alcohol/water is collected and distilled, so that the alcohol may be reused in the system. Other hydrocarbon/alcohol solvents may be used, if permitted by federal regulations in the processing of food products.

EVALUATION IN MEAT PRODUCTS

The bland soy protein concentrate of the subject invention was subject to blind sample tests by an independent agency to compare the performance of the subject product with other commercially available protein products in emulsified meat products. Such meat products included frankfurters, braunschweiger and olive loaf. Comparisons of the subject product to calcium reduced skim milk in olive loaf were made. The subject product was compared to non-fat dry milk in braunschweiger. Three other soy protein concentrate (SPC) products which are commercially distributed, and two soy protein isolate products were compared to the subject product in frankfurters. The results of these tests are reported below.

COMPARISON TO ISOLATES

Two commercially available soy protein isolates and the subject SPC product were used to make frankfurters for refrigerated shelf life comparisons. The respective samples were made up to include 2% by weight of the respective isolates and the subject SPC product. The comparison of SPC products was done at 3.5% by weight SPC. There were a total of seven frankfurter samples, including a control, the subject product, two commercially available protein isolates, and three commercially available SPC products used in the tests.

The tests in frankfurters were made first comparing the subject product to the isolates and the control, and a second set of tests were made to compare the subject SPC product with three commercially available SPC products and the control. In the first and second set of tests, several of the individual ingredients of the formulations of the control frankfurters and the frankfurters containing the subject SPC varied slightly as indicated below. It is not believed to be a sufficient difference to affect the results.

The refrigerated shelf-life comparison of frankfurters utilized frankfurters made according to the following process:

1. Lean beef containing 12.5% by weight fat is ground using ⅛" (3.18 mm) orificed plate on grinder. About 37.1 to 39.4 parts out of 100 parts total is used.
2. The lean beef is then chopped with about 11 parts of ice. Salt is added, along with corn syrup solids (CSS), seasoning, dextrose, erythorbate, and nitrite.
3. The chopping is continued while slowly adding another 11.1 parts ice and about 33.3 to 34.5 parts pork trim (66% fat), and chopping to 45° F. (7.2° C.).
4. About 0.09 parts liquid smoke (Stange SMOKE No. 100) is added with chopping continued to 55° F. (12.8° C.).
5. The chopped product is stuffed into cellulose frankfurter casings.

The above procedure is repeated for each type of frankfurter sample to be tested, but the particular ingredient to be tested is added in the specified amount. For example, the frankfurter incorporating the SPC of the subject invention had 2 or 3.5 parts by weight of SPC added to it, depending on the test. The first sample containing SPC or soy protein isolates had 2 parts by weight added to them.

6. The respective frankfurter samples are next subjected to a smokehouse process, which takes about 2 hours to bring the product to 155° F. (68.3° C.) internal temperature. Initially, the franks are held at 140° F. (60.0° C.) for 45 minutes; then 160° F. (71.1° C.) for 35 minutes; followed by 175°/138° F. (79.4°/58.9° C.) for 15 minutes; 185°/140° F. (85°/69° C.) for 25 minutes, and then showering with cold water and chilling for about 8 hours at 40° F. (4.4° C.).
7. The cellulose casings are then peeled off, and the franks are vacuum packaged (8 to a package) for the refrigerated or frozen storage tests.

At various intervals, samples were evaluated by 8-10 untrained panelists rating each product on a hedonic scale for the parameters of color, texture, flavor, odor, juiciness and general acceptance. In general, color, texture and flavor remained constant throughout the refrigerated storage period, and all the products had acceptable sources after 40 days. The specific formulations compared are reported in Table 1 below:

TABLE 1

FRANKFURTER FORMULATIONS:
Isolates(2%) vs Subject SPC(2%)

| INGREDIENTS BATCH: | 1 | 2 | 3 | 4 |
|---|---|---|---|---|
| Lean beef (12% fat) | 40.9 | 39.1 | 39.1 | 39.1 |
| Pork trim (69% fat) | 32.1 | 32.4 | 32.4 | 32.4 |
| Ice | 22.1 | 21.7 | 21.7 | 21.7 |
| Salt | 2.3 | 2.2 | 2.2 | 2.2 |
| Corn Syrup Solids | 1.5 | 1.5 | 1.5 | 1.5 |
| Liquid Frank Seasoning (ABC) | 0.27 | 0.27 | 0.27 | 0.27 |
| Dextrose | 0.7 | 0.7 | 0.7 | 0.7 |
| Liquid Smoke (Stange Smoke-100) | 0.09 | 0.09 | 0.09 | 0.09 |
| Sodium Erythorbate | 0.04 | 0.04 | 0.04 | 0.04 |
| Sodium nitrite (dissolved) | 0.012 | 0.012 | 0.012 | 0.012 |
| Subject Soy Protein Concentrate | — | 2.0 | — | — |
| Soy Protein Isolate #1 | — | — | 2.0 | — |
| Soy Protein Isolate #2 | — | — | — | 2.0 |

Table 2 below shows the hedonic evaluation of the control, the SPC of the subject invention, and the two commercially available soy protein isolates (SPI) just after manufacture of the frankfurter samples:

TABLE 2

REFRIGERATED SHELF-LIFE EVALUATION-FRANKFURTERS
Subject SPC(2%) vs Isolate(2%)
Day 0

| Product | Color | Texture | Flavor | Odor | Juiciness | General Acceptance | Rating Average |
|---|---|---|---|---|---|---|---|
| Control | 7.6 | 7.5 | 6.8 | 7.1 | 7.5 | 7.1 | 7.3 |
| Subject SPC | 7.6 | 7.5 | 7.0 | 7.1 | 6.6 | 7.1 | 7.2 |
| SPI #1 | 7.5 | 7.5 | 7.4 | 7.1 | 7.1 | 7.3 | 7.3 |
| SPI #2 | 7.8 | 7.3 | 6.4 | 7.1 | 6.6 | 6.5 | 7.0 |

Table No. 3 shows the same hedonic evaluation after fourteen week's storage of all four samples under the same conditions:

TABLE 3

REFRIGERATED SHELF-LIFE EVALUATION-FRANKFURTERS
Subject SPC(2%) vs Isolates(2%)
WEEK 14

| Product | Color | Texture | Flavor | Odor | Juiciness | General Acceptance | Rating Average |
|---|---|---|---|---|---|---|---|
| Control | 7.5 | 6.9 | 5.0 | 6.3 | 6.1 | 4.5 | 6.1 |
| Subject SPC | 7.3 | 6.8 | 5.9 | 6.1 | 6.3 | 5.5 | 6.3 |
| SPI #1 | 7.3 | 7.0 | 5.9 | 6.5 | 6.0 | 5.4 | 6.4 |
| SPI #2 | 7.4 | 7.1 | 6.3 | 6.1 | 6.0 | 5.3 | 6.4 |

The above hedonic comparisons demonstrate that the soy protein concentrate frankfurter of the subject invention is fully equivalent in functionality to the control frankfurter and to frankfurters containing soy protein isolates when the soy products are added to frankfurters at the 2% level.

The above results reported in Tables 2 and 3 are significant, because soy protein isolates are most costly to manufacture than the subject SPC product. In the typical preparation of a soy protein isolate, about 100 pounds of soy flour containing about 50% by weight protein is required to produce about 30 pounds of soy protein isolate, which contains only about 28 pounds of protein. There is a big loss of protein in the first alkali-solubilizing step, and the by-product residue creates serious waste problems. The separation of sugars from the solubilized protein adds cost, as does the spray drying required.

Since isolates cost considerably more to make than the subject soy protein concentrate, it is easy to appreciate that the subject soy protein concentrate is a significant improvement over such isolates. Even more superior results were observed in comparing the subject soy protein concentrate to other soy protein concentrates.

The same test comparison was repeated, using a control and the soy protein concentrate of the subject invention compared with three different commercially available soy protein concentrate products. The compositions of the samples are set forth below in Table 4:

TABLE 4

FRANK FORMULATIONS
Subject SPC(3.5%) vs Three Commercial Soy Protein Concentrates(3.5%)

| INGREDIENTS | BATCH 1 | 2 | 3 | 4 | 5 |
|---|---|---|---|---|---|
| Lean beef (18% fat) | 39.4 | 35.8 | 35.8 | 35.8 | 35.8 |
| Pork trim (61% fat) | 33.6 | 34.7 | 34.7 | 34.7 | 34.7 |
| Ice | 22.1 | 21.3 | 21.3 | 21.3 | 21.3 |
| Salt | 2.3 | 2.2 | 2.2 | 2.2 | 2.2 |
| Corn Syrup Solids | 1.5 | 1.5 | 1.5 | 1.5 | 1.5 |
| Liquid Frank Seasoning (ABC) | 0.27 | 0.27 | 0.27 | 0.27 | 0.27 |
| Dextrose | 0.7 | 0.7 | 0.7 | 0.7 | 0.7 |
| Liquid Smoke (Stange Smoke 100) | 0.09 | 0.09 | 0.09 | 0.09 | 0.09 |
| Sodium Erythorbate | 0.04 | 0.04 | 0.04 | 0.04 | 0.04 |
| Sodium Nitrite (dissolved) | 0.012 | 0.012 | 0.012 | 0.012 | 0.012 |
| SPC (this invention) | | 3.5 | | | |
| SPC #1 | | | 3.5 | | |
| SPC #2 | | | | 3.5 | |
| SPC #3 | | | | | 3.5 |

The hedonic evaluations of the Table 4 sample prior to refrigerated storage are reported in Table 5 below:

TABLE 5

REFRIGERATED SHELF-LIFE EVALUATION FRANKFURTERS
Subject SPC vs Three Commercial SPC Products
DAY 0

| Product | Color | Texture | Flavor | Odor | Juiciness | General Acceptance | Rating Average |
|---|---|---|---|---|---|---|---|
| Control | 7.5 | 7.5 | 7.3 | 6.8 | 7.4 | 6.9 | 7.2 |
| Subject SPC | 7.2 | 6.9 | 6.3 | 6.5 | 6.0 | 6.0 | 6.6 |
| SPC #1 | 7.1 | 6.3 | 4.7 | 6.3 | 6.2 | 4.8 | 5.9 |
| SPC #2 | 7.1 | 6.7 | 5.3 | 6.5 | 5.0 | 4.8 | 5.9 |
| SPC #3 | 6.6 | 5.9 | 4.6 | 5.9 | 5.1 | 4.3 | 5.4 |

At Day "0", it can be seen that the frankfurters containing the SPC made according to the invention had an overall higher rating than any of the frankfurters containing the three commercially available soy protein concentrates. The control rated higher than all SPC containing franks in the initial comparisons.

The five sample types were again compared after 28 days of refrigerated storage. The hedonic values are set forth in Table 6 below:

TABLE 6

REFRIGERATED SHELF LIFE EVALUATION FRANKFURTERS
Subject SPC vs Three Commercial Soy Protein Concentrates
Day 28

| Product | Color | Texture | Flavor | Odor | Juiciness | General Acceptance | Rating Average |
|---|---|---|---|---|---|---|---|
| Control | 7.8 | 7.1 | 6.6 | 7.4 | 7.1 | 6.8 | 7.1 |
| Subject SPC | 7.4 | 6.1 | 5.9 | 7.3 | 5.8 | 5.6 | 6.4 |
| SPC #1 | 7.3 | 6.0 | 4.9 | 6.6 | 5.1 | 5.0 | 5.8 |
| SPC #2 | 7.6 | 5.8 | 4.5 | 5.3 | 6.5 | 4.9 | 5.8 |
| SPC #3 | 7.8 | 6.9 | 3.9 | 5.1 | 5.6 | 4.1 | 5.4 |

The frankfurters containing the soy protein concentrate of the subject invention were again rated overall better than the franks containing the three commercially available SPC products. In some rating criteria, the subject SPC frankfurter samples moved closer to the control in the 28 day evaluation. For example, flavor dropped less for the subject SPC franks than for the control. Juiciness decreased slightly less for the subject SPC franks. The conclusion to be reached from the subject "blind" tests is that the subject soy protein concentrate in franks is fully equivalent to soy protein isolate-containing franks and superior to frankfurters containing any one of the other three commercially available soy protein concentrates.

Some of the characteristics of the subject soy protein concentrate product are compared to the other three commercially available products in Table 7 below:

TABLE 7

| Product | Ash | NSI | Sodium (ppm) | Petroleum Ether Extractable | Water Absorption |
|---|---|---|---|---|---|
| Subject SPC | 5.1 | 6–15 | 46 | 0.3 | 290–320 |
| SPC #1 | 5.8 | 3.7 | 35 | 0.3 | 250–270 |
| SPC #2 | 3.45 | 5.4 | 61 | 1.7 max. | 296* |
| SPC #3 | 6.1 | 23.7 | 8820 | 1.5 | 240 |

*(water absorption continued after test time period)

It should be noted from the above table that none of the three commercially available SPC had an NSI value comparable to the SPC product of the subject invention. One had higher NSI values, and several had lower NSI values, but none of the other products fell within the range of the subject SPC.

The water absorption levels of the three commercial products were generally lower, except for SPC #2 which was near the lower end of the water absorption range of the subject SPC. However, SPC #2 was found to have an NSI below the range of NSI values of the subject SPC product. The petroleum ether extractables in SPC #2 were 1.7, which is more than five times higher than the 0.3 value of the subject SPC.

In general, frankfurters containing the subject SPC product had better texture and juiciness than was observed in frankfurters containing one of the three commercial SPC's to which they were compared. The high NSI value (23.7) of SPC #3 did not appear to contribute to the performance of the SPC #3 in frankfurters.

SPC #1 had a very low NSI value (3.7) because of the processing conditions employed. This product did not bind water or fat as well as the subject SPC, and frankfurters made with SPC #1 had poor texture and mouthfeel.

Although SPC #2 had an apparent water absorptive value (296) in the test employed, the absorption was not completed at the end of the test period, and frankfurters made using SPC #2, having an NSI of 5.4, had a mushy texture and gave poor yields. This characteristic is believed to be due to initially slow, but high water uptake.

Even though the literature has indicated that a high NSI (70 or higher) is required to extrude SPC, the subject SPC product, which has an NSI in the range of 6–15, has been found to be easily extruded to form desirable textured products. For meat emulsions, it appears that the subject SPC product has an optimum range of water absorption. Water is held, but not at a level which is too low or too high.

The subject SPC product was also compared to nonfat dry milk as an ingredient in braunschweiger sausage, and to calcium-reduced skim milk as an ingredient in olive loaf. Both of these dairy products are considerably more expensive, compared to the subject SPC product, so there is a substantial saving possible if they can be replaced.

The braunschweiger sausage formulations compared are set forth immediately below in Table 8:

TABLE 8

BRAUNSCHWEIGER

| INGREDIENTS | FORMULATION (%) | |
|---|---|---|
| | 1 | 2 |
| Pork Livers | 46.1 | 42.9 |
| Pork Jowls | 46.1 | 42.9 |
| Salt | 2.2 | 2.2 |
| Dextrose | 1.8 | 2.2 |
| White Pepper | 0.2 | 0.25 |
| Onion Powder | 0.2 | 0.25 |
| Nutmeg | 0.1 | 0.14 |
| Ginger | 0.05 | 0.08 |
| Non-Fat Dry Milk (NFDM) | 3.2 | |
| Subject SPC Product | | 3.2 |
| Sodium Nitrite (dissolved) | 0.014 | 0.014 |
| Sodium Erythorbate | 0.042 | 0.042 |
| Water | | 5.9 |

Both non-fat dry milk and the subject SPC product were used at the same level (3.2%) in the braunschweiger samples compared for color, texture, flavor and general acceptance by a taste panel of an independent testing agency. The results of the comparison are reported below in Table 9:

TABLE 9

PREFERENCE EVALUATION BRAUNSCHWEIGER

| Product | Color | Texture | Flavor | General Acceptance | Rating Average |
|---|---|---|---|---|---|
| No. 1 Control (NFDM)* | 7.8 | 7.9 | 7.7 | 7.8 | 7.8 |
| No. 2 Subject SPC | 7.8 | 8.0 | 7.8 | 7.9 | 7.9 |

*NFDM - Non Fat Dry Milk

The braunschweiger containing the subject SPC rated consistently better than the braunschweiger containing non-fat dry milk (texture, flavor and general acceptance), and it is equal to the control in color evaluation. The subject SPC is clearly an excellent replacement for non-fat dry milk in braunschweiger at a considerable cost saving.

The subject SPC was also compared to calcium-reduced skim milk in olive loaf samples for the same properties of color, texture, flavor and general acceptance. The formulations for the control and the subject SPC containing olive loaf products are set forth below in Table 10:

TABLE 10

OLIVE LOAF

| INGREDIENTS | FORMULATIONS (%) | |
|---|---|---|
| | 4 | 5 |
| Lean Beef (10% fat) | 25.5 | 24.5 |
| Pork Jowls (70% fat) | 12.8 | 11.8 |
| Salt | 1.8 | 1.8 |
| Water/Ice | 21.9 | 24.0 |
| Calcium reduced skim milk | 7.3 | |
| Subject SPC | | 6.0 |
| Olives | 8.1 | 8.1 |
| Sweet Red Peppers | 2.4 | 2.4 |
| Liquid Loaf Seasoning (ABC) | 0.06 | 0.06 |
| Vegetable Oil | 0.15 | 0.15 |
| Paprika | | 0.05 |
| Dextrose | | 1.2 |
| Sodium nitrite (hydrated) | 0.01 | 0.01 |

It should be noted that 7.3% by weight calcium reduced skim milk was used, whereas only 6% by weight of the subject SPC was required. The results of the comparison of olive loaf samples containing calcium-reduced skim milk with those containing the subject SPC product are set forth below in Table 11:

TABLE 11

PREFERENCE EVALUATION OLIVE LOAF

| Product | Color | Texture | Flavor | General Acceptance | Rating Average |
|---|---|---|---|---|---|
| No. 4-containing calcium-reduced skim milk | 7.6 | 7.1 | 6.7 | 6.3 | 6.9 |
| No. 5-containing Subject SPC | 7.6 | 7.3 | 6.7 | 6.4 | 7.0 |

As shown in Table 11, the olive loaf samples containing the subject SPC product performed consistently better than the control in texture, flavor and general acceptance. Color was equal to the control. The overall rating of the olive loaf containing the subject SPC product was higher than the control.

The cost of calcium-reduced skim milk is considerably higher than the cost of the subject SPC product. The latter is completely interchanged with the calcium-reduced skim milk in the product formula, and in a reduced amount creating a substantial cost saving while providing a functionally equal or superior olive loaf product.

The superior performance of the subject SPC product is believed to be due to the particular processing steps which are especially geared to produce the complete combination of properties obtained. The alcohol extraction steps are important to the removal of sugars and other unwanted flavor components, but the alcohol itself must be removed so that it does not affect the flavor and other properties of the subject SPC product. The alcohol desolventization is different from any prior art desolventizing and drying process to carefully preserve the desired properties obtained by the earlier processing steps. Care is taken to avoid excessive heating of the product during desolventizing and drying, and this is accomplished partly by the use of fluidized bed desolventizer employing a hot humid, inert gas atmosphere and a longer residence time in the desolventizer. The product properties are the result of these important steps in combination with all the earlier steps of the process.

The desired combination of physical properties was established in part by experience, the principal goal being to provide a bland, flavorless vegetable protein product which can be used in combination with meat emulsions to give meat products such as frankfurter, braunschweiger and olive loaf, as well as other meat products, which have good texture, color, odor, juiciness and other properties which give such products a general acceptance equal to, or superior to, the same meat products without the added SPC, or in which SPC replaces another component, such as non-fat dry milk or calcium-reduced skim milk.

TEST PROCEDURES

1. Moisture (oven method)

The moisture in a 10 g sample is removed by heating the sample in an oven at 135° C. for two hours. After heating, the sample is cooled in a dessicator and weighed. A forced draft oven, controlled for uniform heating within ±2° C. of the specified temperature, is used.

$$\text{Percent Moisture in sample} = \frac{\text{loss weight} \times 100}{\text{dry weight of sample}}$$

2. Protein Analysis

The AOCS Official Testing Procedure Ba 4-38, or comparable test, is used. A typical result is 70–73% protein for the subject SPC product.

3. Azeotrope Extract

A thoroughly mixed and ground 5 g sample is placed on a filter paper which is then folded and placed in a double thickness cotton extraction thimble. A piece of cotton is placed in the top of the thimble to distribute solvent as it falls on the thimble. The thimble is then placed in a butt extraction tube. The extraction tube is securely connected to a previously dried and tared 100 ml. flask which contains about 75 ml. of azeotrope solvent (20% 3A alcohol and 80% hexane). The oil flask is connected to a water cooled reflux type condenser and heated so that solvent will pass up through the sample to the condenser and drop from the condenser at about 150 drops per minute. Extraction of the 5 g sample is continued for about four hours. The receiving flask is then disconnected and the condensed extract/solvent mixture is heated in a steam bath to evaporate the remaining solvent until no solvent odor can be detected. The extracted residue remaining after the solvent has been evaporated is then dried in an air oven for 1½ hours at 130° C. The extracted residue is then cooled in a dessicator and weighed.

$$\% \text{ azeotrope extract (as is)} = \frac{\text{wt. of extracted residue} \times 100}{\text{wt. of sample (5g)}}$$

There should be no more than 1% by weight (as is) azeotrope extract residue in the product.

4. Water Absorption (See also: Test No. 10—Penetrometer Test)

5 g of the sample is placed in a 50 ml. centrifuge tube. Exactly 40 ml. of distilled water is added, and the mixture is stirred until it is homogeneous. The homogeneous sample is then centrifuged at 2000 rpm. The clear liquor is decanted, and its volume determined.

$$\text{Percent water absorption} = \frac{(40 \text{ minus the no. of ml. decanted liquor}) \times 100}{\text{original weight of sample (5g)}}$$

5. Odor

The sample is shaken in a closed container. The container is opened and immediately smelled by an experienced person having a good sense of smell. The odor description and intensity are recorded. Results reported may range for "none", "bland", "soybean odor", "toasted odor", "traces of solvent" and the like.

6. NSI (nitrogen solubility index)

A.O.C.S. - Official Testing Method Ba 11-65 is used. Typical results for the subject SPC product are in the range of 6–15%.

7. Hexane Residue

Hexane is extracted from the SPC product with 2,2,4-trimethyl pentane (chromato-quality 99 mol%) and water from Freon TF (duPont Specification 75-F) added as an internal standard. The resulting supernatant is analyzed by gas-liquid chromatography. Care is taken to suit the operating conditions to the particular gas liquid chromatograph instrument used, and the settings and calibration should be checked when the analysis is performed. A Hewlett-Packard Corp., Avondale, Pa., Model H.P. 5700 A Gas-Liquid Chromatograph with flame ionization detector response is suitable, and has a stainless steel column which is 1/8 inch in diameter by 15 feet in length. The column is packed with 10% OV-101 (Supelco, Inc., Belafonte, Pa.) on 80/100 mesh Chromosorb W-H.P. (supplied by Supelco, Inc.). An electronic integrator, such as Spectra-Physics Auto Lab I (Spectro-Physics, Inc., Santa Clara, Calif.) is used to integrate the raw data obtained from the GLC. The column temperature is maintained at 60° C. isothermal for eight minutes; then raised to 150° C. at a rate of about 32° C./min., with a four minute hold. The entire run can be made at 60° C. isothermal. The detector and injection port temperatures are maintained at 150° C. If the column temperature cannot be maintained at 60° C., then the injection port temperature can be lowered. The equipment is calibrated and standardized to obtain the optimum level of sensitivity. It is desirable to extract the sample for about 2 hours for greater accuracy. A 3 microliter sample of supernatant from the sample extraction is used to determine the hexane residue in ppm. Each hexane isomer is calculated separately, and then added together to obtain the total hexane. A typical value using the above GLC equipment was 732 ppm.

8. Ethanol Residue

Ethanol is extracted from SPC samples with water containing n-propanol as an internal standard. The resulting filtrate is analyzed by gas liquid chromatography (GLC). A model HP 5700A Gas-Liquid-Chromatograph system having a flame ionization detector can be used (Hewlett-Packard Corporation, Avondale, Pa.). The equipment is calibrated and standardized to obtain the optimum level of sensitivity. The GLC column is packed with Porapak S, 50/80 mesh, available from Supelco, Inc., Belafonte, Pa. The column temperature is 160° C. isothermal, the detector and injection port temperatures are 200° C. Column injection volume is 3 microliters and the recorder chart speed is 30 in/hr. The sample extraction time is ½ hour, and samples of the subject SPC product typically give residual ethanol residue below 0.2% (2000 ppm), and as low as 100 ppm, in many cases. It must be remembered that the subject test is considerably more sensitive than the test for residual ethanol used by Mustakas et al., J.A.O.C.S., 39:222–226 (April 1962). It is reasonable to conclude that Mustakas et al. would have obtained a much higher residual ethanol value using GLC test methods which are considerably more sensitive than the actual method they employed (Reference No. 6 of above article).

9. Flavor Evaluation

Slurry 5 grams of sample in 95 ml. of bottled nursery water. Place slurry in Waring Blender and blend at high speed for one minute. Transfer to a clean 250 ml. beaker. Slurry is not ready to taste. Stir with spoon to get solids in suspension just prior to tasting. Rate flavor on a scale of 1 to 10. Scores of at least 6 are acceptable.

Typical comments by flavor test panel members include: "bland", "bitter", "beany", "alcohol" taste, "sour", "fruity" and the like. The panel members also have had experience in tasting soy flour products, and other soybean products as a basis for making the graded comparison of the subject test. The subject product normally scores higher than 6, and should be bland without any "beany", "bitter", or "alcohol" taste, nor should it taste "sour" or "fruity".

10. Penetrometer Test for Water Absorption

The soy protein concentrate is hydrated with cold water in a ratio of 3 parts water to 1 part soy protein concentrate, which is stirred for 2 minutes, then put into a beaker and allowed to hydrate for 10 minutes. A weighted probe is allowed to sink into the hydrated product. If the probe penetrates further than 30 mm, water absorption is poor. If the probe sinks less than 7 mm, product may absorb water excessively, and the food may be too dry. The Penetrometer can be obtained from:

Fisher Scientific Co.
International Division
52 Fadem Road
Springfield, N.J. 07081

The probe is a Nalgene Centrifuge Tube, 50 ml., also available from Fisher Scientific Co. The Nalgene tube is cut to about 10 cm. A rod is glued into the probe. Lead shot weight is added into the probe until the total weight including a cap (cork, rubber stopper, etc.) is 150 grams. The length of the rod is about 164 mm.

11. Bostwick Flow Method for Determining Viscosity of Soy Protein Concentrate In this test, the soy protein concentrate is hydrated with cold water in a ratio of 3 parts water to 1 part soy protein concentrate, which is stirred for 1.5 minutes, poured into the well of the Bostwick and allowed to stand for 5.5 additional minutes. The total hydration time is 7 minutes. The Bostwick is set at an incline of 30°. After 7 minutes, the gate is opened. The distance that the hydrated soy protein concentrated flows down the Bostwick in 2 minutes is the recorded value.

The subject soy protein concentrate should not exceed 15 cm flow; this would indicate poor absorption. In this test, the least flow implies the best product.

The Bostwick Consistometer can be obtained from:

Central Scientific Co.
International Sales
2600 South Kostner Ave.
Chicago, Illinois 60623

SUMMARY

In summary, it is believed that the subject SPC product had unique functional advantages and a substantially bland flavor because of the above described hexane/aqueous alcohol extraction and alcohol extraction, along with the closely controlled low temperature desolventizing and drying steps employed. The hexane/aqueous alcohol extraction precedes the alcohol extraction, and is believed to make the alcohol extraction more effective. The hexane/alcohol/water solvent used initially removes substantially all undesired glycerides and phosphatides. Their removal first allows the alcohol to be used more efficiently in the second extraction step, which removes all the alcohol-soluble materials, including carbohydrates such as raffinose and stachyose. The removal of the alcohol is then accomplished by continuous desolventizing in a fluidized bed with a long residence time at relatively low temperatures. This gentle desolventizing method assures that the resulting product will be as bland and colorless as possible, containing no undesired flavors, and having an ethanol residue of no more than about 1000 ppm, and in most cases less than 200 ppm.

The resulting bland vegetable protein concentrate is useful in many foods in which protein is desired. It may replace dairyderived proteins in prepared meats, such as braunschweiger and olive loaf. The subject vegetable protein concentrate is useful in baked goods, prepared cereals, and snack foods. Frankfurters containing the subject protein product are comparable to conventional frankfurters and superior in desirable properties including flavor, texture and juiciness to such frankfurters made with vegetable protein made by other methods. The subject soy protein concentrate has proved to be equivalent to soy protein isolate in frankfurters at comparable levels of use, and the subject soy protein concentrate is much more economical to manufacture, because there are fewer manufacturing steps and much less waste material. The amount of usable protein recovered is much greater.

The continued rising costs of animal protein have made a more economical vegetable protein product for supplementing or replacing animal protein a necessity. The subject vegetable protein product fills this urgent need in a number of applications, and at great economy while eliminating the drawbacks normally associated with vegetable protein products. Both appetizing and highly nutritious foods can be made using the subject vegetable protein product.

We claim:

1. In a continuous method for making a bland, defatted, substantially flavorless and odor-free vegetable protein product by removing solvent from a moist, solvent-containing vegetable protein material, said method comprising the steps of:
    (a) continuously supplying said moist vegetable protein material to a desolventizing apparatus having a gas inlet and outlet; (b) continuously flowing a humid, inert gas through said protein material at a velocity sufficient to fluidize said vegetable protein material and to move it as a fluidized bed;
    (c) moving said vegetable protein material in the stream of inert gas through a tortuous path whereby all particles of said vegetable protein material are subjected to steady fluidizing action;
    (d) maintaining the temperature of said inert inlet gas below 260° F. (127° C.) and its velocity and pressure sufficient to sustain intimate mixing with the vegetable protein material to maintain said vegetable protein material in a fluidized state and to remove solvent therefrom during the course of the tortuous path;
    (e) maintaining the dewpoint at the gas inlet of said desolventizing apparatus in the range of 100°–140° F. (37.8°–60° C.) and the dewpoint at the gas outlet of said desolventizing apparatus in the range of 130°–155° F. (54.4°–68.3° C.);
    (f) controlling the flow rate of said vegetable protein material along said tortuous path so that the average time the particles of vegetable protein material remain in contact with said humid, inert gas is from 1-6 hours, whereby the vegetable protein material is effectively continuously desolventized to a level below about 2,000 ppm solvent as measured by gas liquid chromatograph; and
    (g) continuously separating desolventized vegetable protein material from the inert gas.

2. The method of claim 1, in which the solvent remaining in the vegetable protein material comprises volatile liquid hydrocarbon.

3. The method of claim 2, in which the hydrocarbon comprises hexane.

4. The method of claim 1 in which the solvent desolventized from the vegetable material comprises lower alcohol.

5. The method of claim 4, in which the lower alcohol consists essentially of ethanol.

6. The method of claim 4 in which the vegetable protein material comprises a defatted vegetable material selected from the group consisting of soybean, rapeseed, sesame seed, safflower seed, cottonseed, sunflower seed, peanut, maize, yellow field pea and horse bean.

7. The method of claim 6 in which the defatted vegetable material consists essentially of a soy protein concentrate and the solvent consists essentially of a lower alcohol.

8. The method of claim 7, in which the inert gas is selected from the group consisting of nitrogen and carbon dioxide, and is mixed with steam, and the vegetable protein material is maintained at a temperature below 175° F. (79.4° C.) during desolventizing.

9. The method of claim 8 in which the desolventized vegetable protein material contains less than 1,000 ppm solvent and about 20-40% by weight moisture upon leaving the desolventizing apparatus and the desolventized vegetable material is thereafter dehydrated by continuously agitating and moving said desolventized vegetable protein material along a tortuous path to expose the particles of the material to steady, fluidizing action while simultaneously supplying dry heated air to said material at a temperature of less than 300° F. (149° C.).

10. The method of claim 9 in which the desolventized vegetable protein material is moved along said tortuous path for about one to six hours, and the desolventized vegetable material is dehydrated to a final moisture content of less than about 8% by weight.

11. The method of claim 7 in which said desolventized vegetable protein material is a vegetable protein concentrate having a water absorption of 270-350 and an NSI of 6-15.

12. The method according to claim 11 wherein the desolventized vegetable protein concentrate is subsequently dehydrated to a final moisture content of less than about 8% by weight in a continuous dryer supplied with heated air at a temperature of not more than 260° F. (127° C.).

13. The method of claim 11 wherein the vegetable protein concentrate is prepared by extracting the fatty materials from a vegetable oilseed material with a mixture comprised of hexane, ethanol and water followed by an aqueous ethanol extraction to provide a moist vegetable protein concentrate which contains ethanol.

14. The method according to claim 13 wherein the vegetable protein concentrate consists essentially of soy protein concentrate and the temperature of said soy protein material is maintained at about 130°-155° F. (54.4°-68.3° C.) during fluidized bed drying.

15. The method of claim 14 in which the desolventized soy protein material contains about 66-73% by weight protein (dry solids basis), said desolventized soy protein material having a nitrogen solubility index of about 6-15%, a water absorption of 270-350, a completely bland flavor, and is substantially odor-free.

16. A bland, odorless, vegetable protein concentrate for use in protein-containing food products prepared in accordance with the method of claim 4 with said vegetable protein concentrate being further characterized as having a Bostwick viscosity flow value of less than 10, a water absorption penetrometer test reading in the range of 7-30 mm, and a NSI of 6-15, and a total protein content of about 66-73% calculated from Kjeldahl nitrogen.

17. The vegetable protein concentrate of claim 16 in which the residual alcohol is no more than 1000 ppm.

18. A prepared meat product containing the soy protein concentrate of claim 16.

* * * * *

UNITED STATES PATENT AND TRADEMARK OFFICE
CERTIFICATE OF CORRECTION

PATENT NO. : 4,265,925
DATED : May 5, 1981
INVENTOR(S) : Michael F. Campbell, Richard J. Fiala; James D. Wideman and John F. Rasche It is certified that error appears in the above-identified patent and that said Letters Patent are hereby corrected as shown below:

In the Abstract, line 28, for "repeseed" read ---rapeseed---.
Column 5, bridging lines 24/25, for "similarly by prepared" read ---similarly prepared---.
Column 6, line 3, for "feed stock" read ---stock feed---.
Column 13, line 46, for "sources" read ---scores---
Column 19, line 64, for "water from Freon" read ---water with Freon---.
Column 21, line 67, for "dairyderived" read ---dairy-derived---.

Signed and Sealed this

Tenth Day of November 1981

[SEAL]

Attest:

GERALD J. MOSSINGHOFF

Attesting Officer      Commissioner of Patents and Trademarks